March 14, 1939.  G. H. DREISBACH  2,150,269
FLOATING DRAWBAR GUIDE FOR TRACTORS
Filed Sept. 3, 1937  3 Sheets-Sheet 1
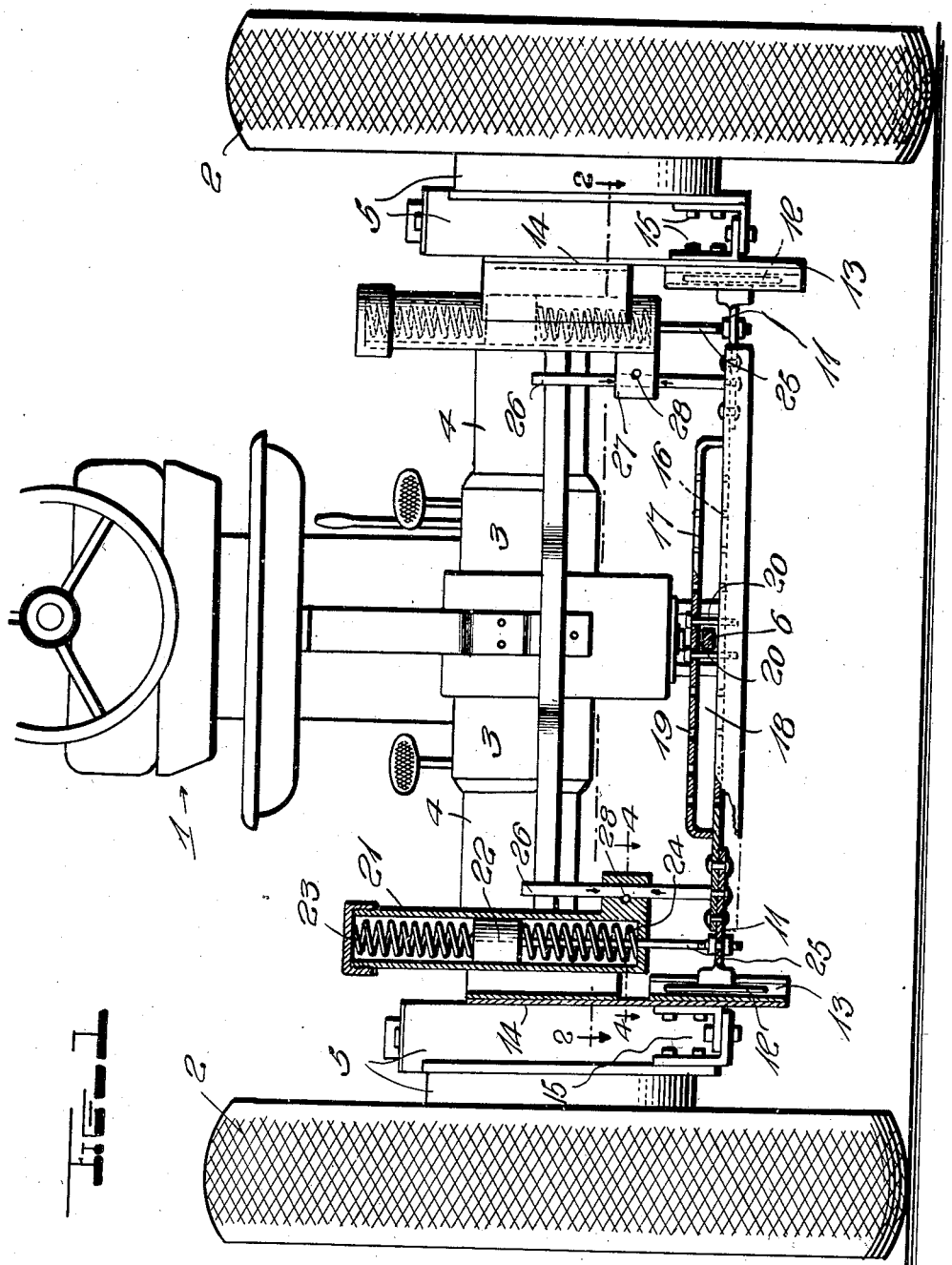
INVENTOR.
Gerald H. Dreisbach,
BY
ATTORNEY.

March 14, 1939.  G. H. DREISBACH  2,150,269
FLOATING DRAWBAR GUIDE FOR TRACTORS
Filed Sept. 3, 1937  3 Sheets-Sheet 2
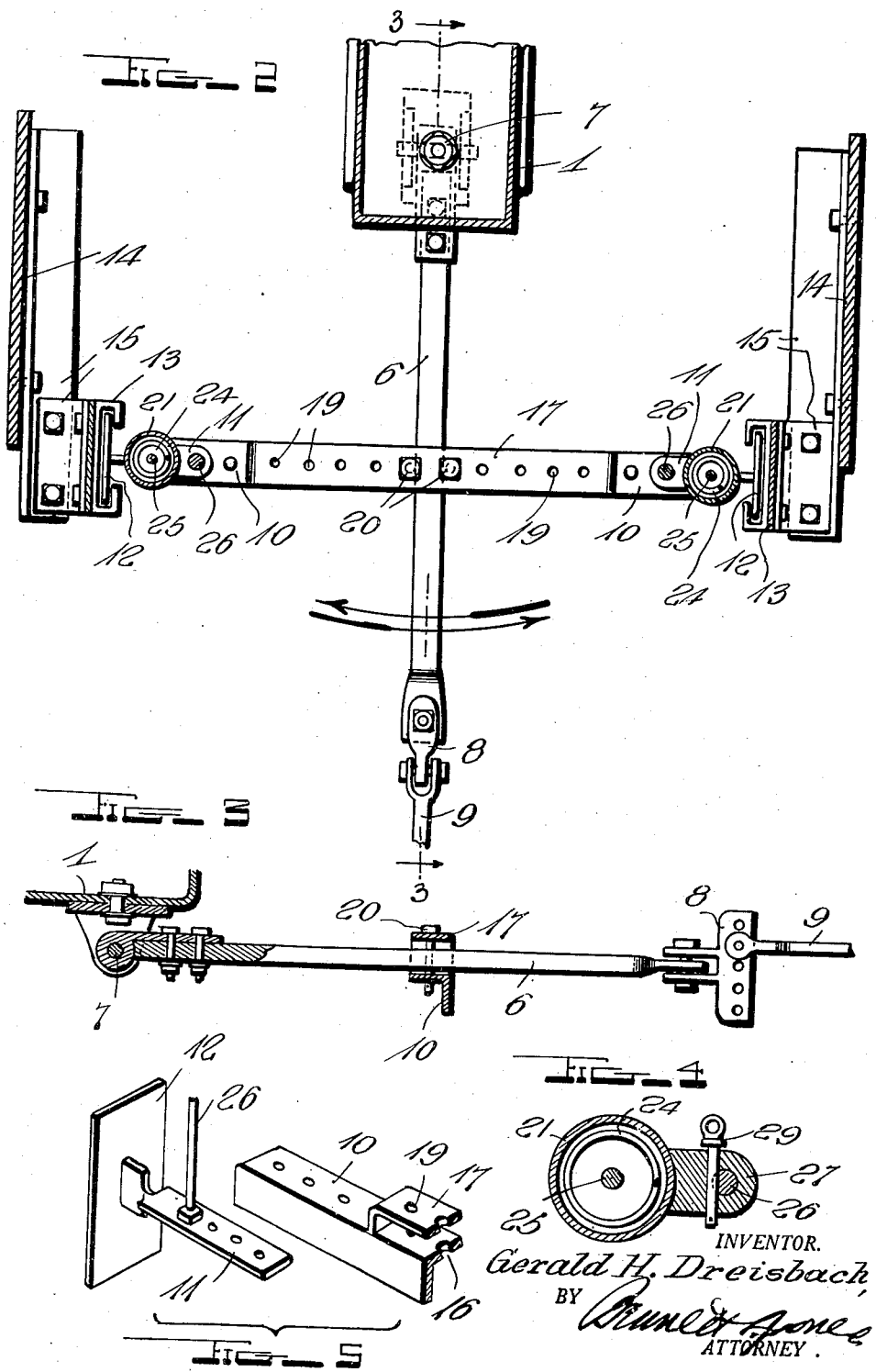
INVENTOR.
Gerald H. Dreisbach
BY
ATTORNEY.

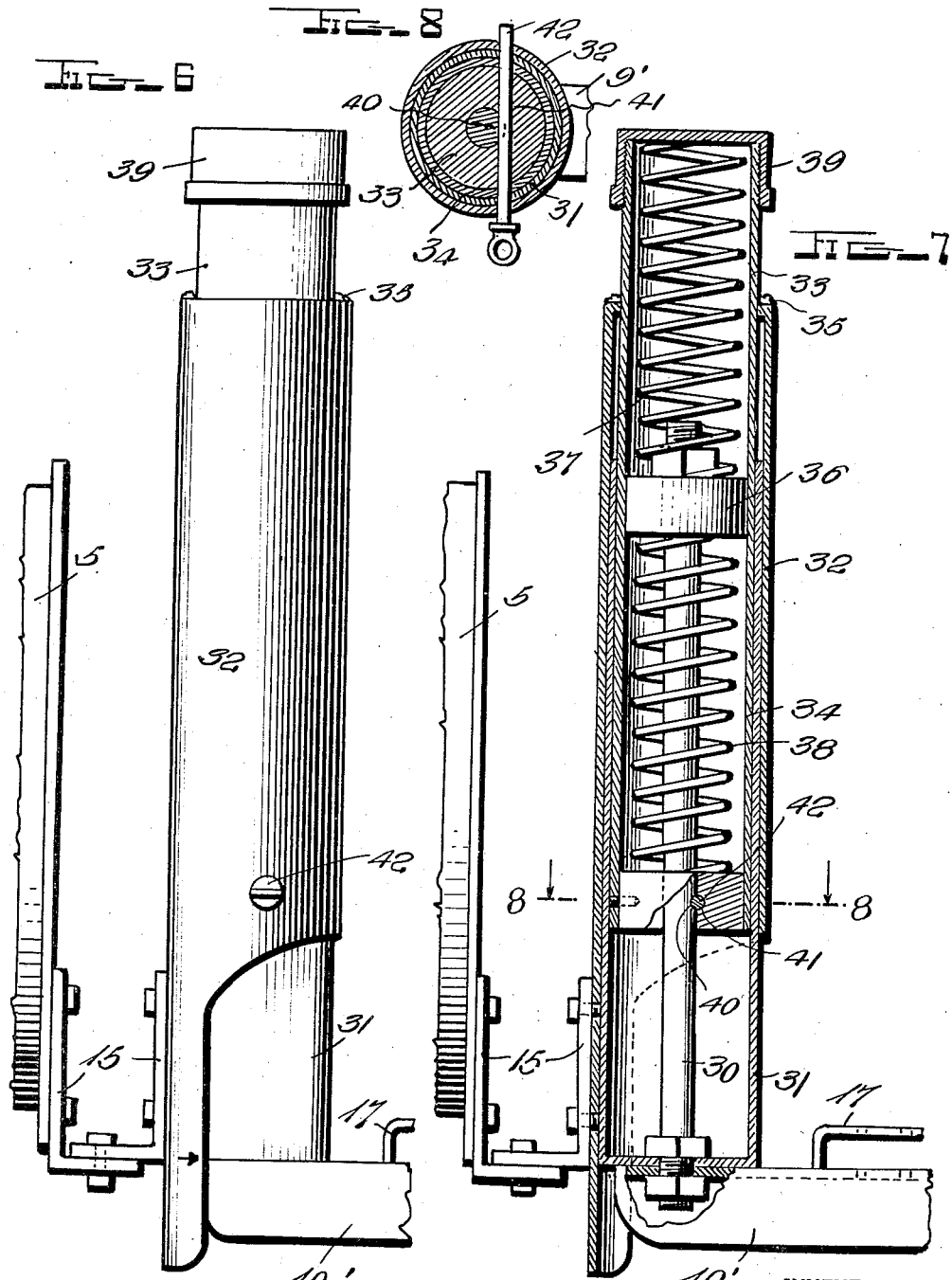

Patented Mar. 14, 1939

2,150,269

UNITED STATES PATENT OFFICE 2,150,269

FLOATING DRAWBAR GUIDE FOR TRACTORS

Gerald H. Dreisbach, Wauseon, Ohio

Application September 3, 1937, Serial No. 162,359

9 Claims. (Cl. 280—33.44)

This invention relates to a floating drawbar guide for tractors, especially three-wheeled tractors, and has for its object to provide a floating drawbar guide which will keep the tractor from rearing and its wheels from spinning when running over uneven ground, which in plowing and like operations will give a straight pull at all times, and in which the guide is self-adjusting with relation to the drawbar when the tractor is running over uneven ground.

The invention consists of the features of construction, combination and arrangement of parts, hereinafter fully described and claimed, reference being had to the accompanying drawings, in which:—

Fig. 1 is a view in rear elevation, with parts in section, of a three-wheeled tractor embodying my invention.

Fig. 2 is a sectional plan view of parts shown in Fig. 1 on the line 2—2 of Fig. 1.

Fig. 3 is a longitudinal section on the line 3—3 of Fig. 2.

Fig. 4 is a detail section taken substantially on such a plane as that indicated by line 4—4 of Fig. 1, showing a locking feature.

Fig. 5 is a fragmentary detail perspective view of parts of the guide structure.

Fig. 6 is a view in elevation showing a modified form of the invention.

Fig. 7 is a view in vertical section of parts shown in Fig. 6.

Fig. 8 is a section on line 8—8 of Fig. 7.

Referring now more particularly to the drawings, I designates a tractor of three-wheeled type, in which the rear wheels 2 are shown. These wheels are carried by a rear wheel assembly including a differential gear housing 3, countershaft housings 4 leading therefrom, and housings 5 enclosing the rear wheel axles and associated parts of the brake mechanism. These may be of any of the types used in tractors of this character.

The tractor is shown as equipped with a drawbar 6 which is pivotally connected, as at 7, to some suitable part of the vehicle in advance of the rear axle assembly, and which extends rearwardly beyond such assembly and is provided at its rear or free end with a draft link or coupling 8 for the attachment thereto of a drawbar or draft connection 9 of an implement to be drawn by the tractor.

Extending transversely of the tractor in rear of and below the level of the housings 3 and 4 of the rear wheel assembly is a guide member 10 in the form of a channeled guide bar. This bar is attached at its ends to bracket plates 11 carrying guide shoes 12 which slidably engage guideways in guide members 13 carried by bracket plates 14 connected by brackets 15 and otherwise suitably connected to portions of the housings 5, whereby said guide member or bar 10 is adapted to move upwardly or downwardly or to have floating motion in a vertical plane.

The body portion of the guide member or bar 10 faces upwardly and is provided with a longitudinal series of spaced openings 16 therein. Superposed upon said body portion of the member 10 is a keeper bar or plate 17 which extends over the bar 10 for a portion of its length and has downturned end portions which are fixedly secured to said bar in any suitable manner. This keeper bar or plate 17 forms a keeper passage or space 18 between it and the bar 10 through which the drawbar 6 extends. This drawbar may be shifted laterally in the passage 18 from a central draft position to any one of a number of side draft positions in either direction for connecting the tractor with a plow, middle buster, or any other suitable type of agricultural or other implement drawn in any prescribed manner behind the tractor in a prescribed draft position. The keeper bar or plate 17 is provided with openings 19 registering with the openings 16 in the guide bar for the passage of cotter pins or bolts 20 which may be disposed on opposite sides of the bar 6 to hold the same from lateral movement and in the desired draft position. The lower ends of these pins or bolts may be secured against displacement by means of nuts or cotter pins.

Supported upon the plates 14 above the brackets 11 are cushioning springs 21, in each of which is arranged a piston 22. This piston is disposed between counteracting top and bottom springs 23 and 24, arranged between the same and the top and bottom heads of the cylinders, respectively, whereby the piston is normally maintained in a central or other prescribed position and is adapted for yielding movements upwardly and downwardly in the cylinder. The pistons have connected therewith rods 25 which extend downwardly through the bottom heads of the cylinders and are connected at their lower ends with the bracket plates 11 whereby the pistons are coupled to the guide bar 10 to control its play or movements in a vertical plane, and whereby a prescribed elastic resistance to the upward movement of the guide bar from a normal horizontal position is established. The shoes 12 fit somewhat loosely in their guides 13 so that they may have a certain degree of tilting motion inwardly and outwardly in a lateral direction in said guides. As the draft bar 6 is coupled to the guide bar 10 in its set draft position, it will be seen that its up and down play or movements are controlled by the guide bar 10, which will allow it to elastically play up and down in the travel of the wheels 2 over irregular ground surfaces, while preventing the bar from thrashing or having any violent up and down movements. The construction described also adapts the bar 10 to tilt vertically to accommodate itself to the diverse movements of the wheels 2, as when the wheels travel on ground surfaces of different levels, without affecting the draft bar 6. The guide mechanism as thus constructed controls the up and down movements of the tractor through its control over the draft bar 6, by means of which rearing and other violent movements of the tractor are prevented in the travel of the tractor over uneven ground surfaces, such movements being resisted and counteracted by the springs of the guide mechanism and are also prevented from being transmitted to the draft bar of the implement being drawn It may be found desirable at times to throw the cushioning means out of action and to fasten the guide bar 10 rigidly in position. Locking means for this purpose is therefore provided. This locking means consists of locking bars 26 extending upwardly from the guide bar 10 or brackets 11 and slidably engaging locking lugs 27 through which they pass, said lugs being secured to or formed on the cylinders 21. The bars 26 and lugs 27 are provided with keeper openings 28 adapted to register in a certain position of the bar, for passage of locking pins 29 whereby the bars may be locked against vertical movement to the keeper lugs. Indicating arrows or other suitable marks may be provided on the bars 26 to indicate whether or not the openings 28 are in register for insertion of the pins 29, so that, if they are not in register, proper measures may be taken to bring them into register so that the pins may be inserted.

In Figs. 6 to 8, inclusive, I have shown a modified form of construction of the cushioning means for the guide bar 10'. In this modified construction the guide bar 10' is fixed at each end to the lower end of a piston rod 30 and the lower end of a sliding cylinder section 31 which is fitted to slide in a guide tube or casing 32 fixed to the adjacent housing 5. The rod 30 extends upwardly to a head 33 fixed to and enclosing the lower end of a stationary cylinder section 34, which is welded or otherwise fixed, as at 35, to the guide tube or casing 32. The upper end of the rod 30, which is disposed in the stationary cylinder section 34, carries a piston rod 36 above and below which are arranged counteracting cushioning springs 37 and 38 which control the movements of the piston and sliding cylinder section 31. The stationary cylinder section 34 is closed at its lower end by the head 33 and at its upper end by a cap 39, and the sliding cylinder section 31 is movable in a guide space between the guide tube 32 and stationary cylinder section 34. This space is closed at the point of weld 35 to prevent the entrance of dust or other foreign particles. The head 35 and rod 30 are provided respectively with a keeper recess 40 and keeper openings 41 for the reception of a locking pin 42 to lock the sliding cylinder section 31, piston 36 and guide bar 10' from movements when desired. An arrow or other indicating mark is provided at the base of the guide tube or casing 32 to register with the upper surface of the bar 10' when the parts 40 and 41 are in registering position to indicate that fact. The operation with this construction will be readily understood from the description given with respect to the construction shown in Figs. 1 to 5, inclusive.

From the foregoing description, taken in connection with the drawings, the construction and mode of operation of my improved floating drawbar guide for tractors will be readily understood without a further and extended description and it will be seen that the invention provides a means of this character which will keep the tractor from rearing and its wheels from spinning when running over uneven ground, which in plowing and like operations will give a straight pull at all times, and in which the guide is self-adjusting with relation to the drawbar when the tractor is running over uneven ground. While the constructions disclosed are preferred, it will, of course, be understood that changes in the form, proportions and details of construction of the parts may be made, within the scope of the appended claims, without departing from the spirit or sacrificing any of the advantages of the invention.

What I claim is:—

1. In combination with a tractor having a rear wheel assembly and a drawbar, the latter pivotally mounted for swinging movements transversely of the tractor to different draft positions, a drawbar guide member extending transversely of the tractor and yieldingly mounted on the wheel assembly for direct straight line movements perpendicular to the plane of the tractor, said guide member having a keeper receiving the drawbar and in which the drawbar is shiftable to different draft positions, and means coacting with the keeper for retaining the drawbar in engagement with said guide member in any one of a plurality of draft positions.

2. In combination with a tractor having a rear wheel assembly and a drawbar, said drawbar being pivoted to the tractor to swing laterally thereof, a drawbar guide member extending lengthwise transversely of the tractor and slidably connected at its ends at opposite sides of the tractor with said assembly for direct straight line movements perpendicular to the plane of the tractor, said guide member having a longitudinal passage through which the drawbar extends and in which the drawbar is shiftable laterally to different draft positions, means for fixing the drawbar to the guide member in a selected draft position, and means for yieldingly opposing movements of the guide member in said plane.

3. In combination with a tractor having a rear wheel assembly including rear axle housings and a drawbar, said drawbar being pivoted to the tractor to swing transversely thereof, a guide member extending lengthwise transversely between said housings and slidably connected at its ends therewith for direct straight line movements in a plane perpendicular to the plane of the tractor, said guide member having a longitudinal passage through which the drawbar extends, means for retaining the drawbar in a predetermined adjusted position in said passage, means yieldingly opposing movements of the drawbar guide member in a vertical plane, and means for locking the drawbar guide member against vertical movement.

4. In combination with a tractor having a rear wheel assembly including rear axle housings, and a drawbar, said drawbar being pivoted to the tractor to swing transversely thereof to different draft positions, a drawbar guide member extending lengthwise transversely of the tractor between said housings and slidably connected at its ends therewith for direct straight line movements in a plane perpendicular to the plane of the tractor, a keeper mounted on the guide bar and providing a retainer in which the drawbar may be adjusted to lie in the center line of draft or at angles thereto, means for retaining the guide bar in a predetermined position of adjustment in said keeper, and means independent of the sliding connections between the guide bar and housings for yieldingly opposing movements of the drawbar in said plane.

5. In combination with a tractor having a rear wheel assembly including rear wheel axle housings, and a drawbar, a guide member extending between and slidably mounted on the axle housings for direct up and down movements perpendicular to the plane of the tractor, means for connecting the drawbar with said guide member, means for yieldingly opposing movements of the guide member in said plane, and means for locking said guide member against such sliding movements.

6. In combination with a tractor having a rear wheel assembly including rear wheel axle housings, and a drawbar, a drawbar guide member extending between said axle housings and slidably mounted thereon for direct up and down straight line movements in a plane perpendicular to the plane of the tractor, said guide member having a guide portion through which the drawbar extends, spring means operating to oppose a yielding resistance to the sliding movements of the guide member, and means for locking the guide member against up and down movements.

7. In combination with a tractor having a rear wheel assembly including rear wheel axle housings, and a drawbar pivotally mounted for vertical movements and lateral swinging movements to different draft positions, a drawbar guide member extending transversely of the tractor and mounted for sliding movements in said housings up and down in a straight line perpendicular to the plane of the tractor, said guide member having a guide portion through which the drawbar extends and in which said bar is adjustable to different angular draft positions, means for retaining said bar in said guide portion in a predetermined position of adjustment, means for yieldingly opposing sliding movements of the guide member, and means for locking the guide member against up and down movements.

8. In combination with a tractor having a rear wheel assembly including rear axle housings, and a drawbar, a guide bar extending transversely of the tractor between said housings and slidably engaged at its ends therewith for direct up and down movements perpendicular to the plane of the tractor, means for engaging and holding the drawbar coupled to said guide member, cylinders mounted on the housings above the ends of the guide member, pistons disposed in said cylinders and connected to the guide member, and springs in said cylinders yieldingly opposing the up and down movements of the pistons and the guide member.

9. In combination with a tractor having a rear wheel assembly including rear axle housings, and a drawbar, a guide member extending between and slidably mounted for direct straight line up and down movements on the housings in a plane perpendicular to the plane of the tractor, means for holding the drawbar connected to said guide member, resilient means comprising cylinders and pistons and springs operating thereon for yieldingly opposing the up and down movements of the guide member, and means for locking the guide member against up and down movements.

GERALD H. DREISBACH.